(12) United States Patent
Liu et al.

(10) Patent No.: US 12,547,286 B2
(45) Date of Patent: *Feb. 10, 2026

(54) TOUCH DISPLAY PANEL, METHOD FOR MANUFACTURING THE SAME, AND DISPLAY APPARATUS

(71) Applicant: BOE Technology Group Co., Ltd., Beijing (CN)

(72) Inventors: Hao Liu, Beijing (CN); Jianchao Zhu, Beijing (CN); Mengyang Wen, Beijing (CN); Zibo Ni, Beijing (CN); Guangliang Shang, Beijing (CN); Libin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/934,162

(22) Filed: Oct. 31, 2024

(65) Prior Publication Data

US 2025/0053272 A1    Feb. 13, 2025

Related U.S. Application Data

(63) Continuation of application No. 18/031,282, filed as application No. PCT/CN2022/096343 on May 31, 2022, now Pat. No. 12,293,049.

(51) Int. Cl.
*G06F 3/044* (2006.01)
*G06F 3/041* (2006.01)
*G06F 3/045* (2006.01)

(52) U.S. Cl.
CPC .......... *G06F 3/0446* (2019.05); *G06F 3/0412* (2013.01); *G06F 3/0443* (2019.05); *G06F 3/045* (2013.01); *G06F 2203/04103* (2013.01)

(58) Field of Classification Search
CPC .... G06F 3/0446; G06F 3/0412; G06F 3/0443; G06F 3/045; G06F 2203/04103; G06F 3/044; G06F 3/041; G06F 3/04164; G09G 2300/0426
See application file for complete search history.

(56) References Cited

U.S. PATENT DOCUMENTS

| | | | |
|---|---|---|---|
| 12,293,049 B2 * | 5/2025 | Liu | G06F 3/044 |
| 2009/0262095 A1 * | 10/2009 | Kinoshita | G06F 3/0446 345/174 |
| 2017/0097727 A1 * | 4/2017 | Wu | G06F 3/0445 |
| 2021/0191550 A1 * | 6/2021 | Wang | G06F 3/0446 |

* cited by examiner

*Primary Examiner* — Temesghen Ghebretinsae
*Assistant Examiner* — Ivelisse Martinez Quiles
(74) *Attorney, Agent, or Firm* — XSENSUS LLP

(57) ABSTRACT

The present disclosure provides a touch display panel. The touch display panel includes a display substrate and a touch layer, wherein the touch layer includes a plurality of touch units and a plurality of touch lines which are disposed on the display substrate; wherein the touch lines are connected to at least one touch unit and are configured to electrically connect the touch unit connected thereto to a touch integrated circuit; the plurality of touch lines at least include a first trace and a second trace which are disposed in a non-display region; and the display substrate includes a conductive layer disposed in the non-display region; wherein at least one first through hole and at least one second through hole are defined in the conductive layer.

20 Claims, 4 Drawing Sheets

TOUCH DISPLAY PANEL, METHOD FOR MANUFACTURING THE SAME, AND DISPLAY APPARATUS

CROSS-REFERENCE TO RELATED APPLICATIONS

This application is a continuation application based on U.S. application Ser. No. 18/031,282, filed on Apr. 11, 2023, which is a U.S. national stage of international application No. PCT/CN2022/096343, filed on May 31, 2022, the disclosure of each is herein incorporated by reference in its entirety.

TECHNICAL FIELD

The present disclosure relates to the field of display technologies, and in particular, relates to a touch display panel, a method for manufacturing the same, and a display apparatus.

BACKGROUND OF THE INVENTION

A touch display panel, as a display apparatus with touch and display functions, is widely used in various electronic products.

SUMMARY OF THE INVENTION

According to embodiments of the present disclosure, a touch display panel, a method for manufacturing the same, and a display apparatus are provided. The technical solutions are as follows.

According to the embodiments of the present disclosure, a touch display panel is provided. The touch display panel includes a display substrate and a touch layer, wherein the display substrate includes a display region and a non-display region surrounding the display region; the touch layer includes a plurality of touch units and a plurality of touch lines, wherein the plurality of touch units are arranged in an array on the display substrate and at least partially disposed in the display region; the plurality of touch lines are disposed on the display substrate, and the touch line is connected to at least one of the touch units and configured to electrically connect the touch unit connected thereto to a touch integrated circuit; the plurality of touch lines at least include a first trace and a second trace which are disposed in the non-display region; and the display substrate includes a conductive layer disposed in the non-display region; wherein at least one first through hole and at least one second through hole are defined in the conductive layer, the first through hole being within an orthographic projection of the first trace on the conductive layer, the second through hole being within an orthographic projection of the second trace on the conductive layer, and a total opening area of the first through hole in per unit area of the first trace being greater than a total opening area of the second through hole in per unit area of the second trace.

In some embodiments of the present disclosure, a ratio of the cross-sectional area of the first trace to the cross-sectional area of the second trace is defined as a first ratio, a ratio of the length of the first trace to the length of the second trace is defined as a second ratio, wherein a ratio of the first ratio to the second ratio ranges from 0.95 to 1.05.

In some embodiments of the present disclosure, a ratio of the total opening area of the first through hole in per unit area of the first trace to the total opening area of the second through hole in per unit area of the second trace is equal to a ratio of the cross-sectional area of the first trace to the cross-sectional area of the second trace.

In some embodiments of the present disclosure, a product of a capacitance between the first trace and the conductive layer and a resistance of the first trace is defined as a first load value, a product of a capacitance between the second trace and the conductive layer and a resistance of the second trace is defined as a second load value, wherein a ratio of the first load value to the second load value ranges from 0.95 to 1.05.

In some embodiments of the present disclosure, a plurality of first through holes and a plurality of second through holes which are arranged in an array are defined in the conductive layer, a number of the first through holes being equal to a number of the second through holes, an opening area of each of the first through holes being different from an opening area of each of the second through holes, and a sum of the opening areas of the first through holes being greater than a sum of the opening areas of the second through holes.

In some embodiments of the present disclosure, a plurality of first through holes and a plurality of second through holes which are arranged in an array are defined in the conductive layer, an opening area of each of the first through holes being equal to an opening area of each of the second through holes, a number of the first through holes being different from a number of the second through holes, and a sum of the opening areas of the first through holes being greater than a sum of the opening areas of the second through holes.

In some embodiments of the present disclosure, the first through hole is in a shape of a polygon, a circle, an ellipse, or an irregular closed pattern, and the second through hole is in a shape of a polygon, a circle, an ellipse, or an irregular closed pattern.

In some embodiments of the present disclosure, the shape of the first through hole is the same as or different from the shape of the second through hole.

In some embodiments of the present disclosure, the display substrate further includes a plurality of light-emitting units disposed in the display region, the light-emitting unit including an anode layer, a light-emitting layer, and a cathode layer which are sequentially stacked, and the anode layer or the cathode layer being in a same layer as the conductive layer.

In some embodiments of the present disclosure, the anode layer is in the same layer as the conductive layer, and an orthographic projection of the cathode layer on the anode layer is outside an orthographic projection of the second trace on the anode layer.

In some embodiments of the present disclosure, the display substrate further includes a power signal line disposed in the non-display region, the conductive layer being connected to the power signal line and the cathode layer.

In some embodiments of the present disclosure, the touch layer further includes a plurality of first connection lines parallel to each other and a plurality of second connection lines parallel to each other, the first connection lines and the second connection lines being disposed in the display region; and the plurality of touch units are divided into a plurality of first touch unit groups and a plurality of second touch unit groups, wherein the first touch unit group includes a plurality of touch units arranged in a same row, the plurality of touch units in the first touch unit group are connected via at least one of the first connection lines and connected to at least one of the touch lines, and the touch lines connected to the plurality of touch units in different first touch unit groups are different; and the second touch unit group includes a plurality of touch units arranged in a same column, the plurality of touch units in the second touch unit group are connected via at least one of the second connection lines and connected to one of the touch lines, and the touch lines connected to the plurality of touch units in different second touch unit groups are different.

In some embodiments of the present disclosure, the touch unit is a transparent conductive layer or is of a metal mesh structure.

In some embodiments of the present disclosure, the touch display panel further includes two touch integrated circuits, wherein the first touch unit group is connected to the two touch integrated circuits via two of the touch lines disposed outside the display region, and the second touch unit group is connected to at least one of the touch integrated circuits via at least one of the touch lines disposed outside the display region.

In some embodiments of the present disclosure, the touch display panel further includes the touch integrated circuit, wherein the first touch unit group and the second touch unit group are connected to the touch integrated circuit via one of the touch lines disposed outside the display region.

In some embodiments of the present disclosure, the display substrate includes an array substrate and a plurality of light-emitting units; wherein the plurality of light-emitting units are arranged in an array on the array substrate; the array substrate includes a base substrate and a plurality of drive circuits, the plurality of drive circuits being arranged in an array on the base substrate; and the drive circuit is connected to at least one of the light-emitting units corresponding to the drive circuit.

In some embodiments of the present disclosure, each of the plurality of touch lines is of a single-layer structure, and two adjacent touch lines in the plurality of touch lines are in different layers; or, at least part of the touch lines include a first sub-layer and a second sub-layer which are disposed in different layers, orthographic projections of the first sub-layer and the second sub-layer on the display substrate being at least partially overlapped, and the first sub-layer and the second sub-layer being connected to each other by at least one via hole.

According to the embodiments of the present disclosure, a display apparatus is provided. The display apparatus includes: the touch display panel as described above, and a power supply component electrically connected to the touch display panel.

According to the embodiments of the present disclosure, a method for manufacturing a touch display panel is provided. The method includes: providing a display substrate, wherein the display substrate includes a display region and a non-display region surrounding the display region, the display substrate comprises a conductive layer disposed in the non-display region, and at least one first through hole and at least one second through hole are defined in the conductive layer; and forming a touch layer by forming a plurality of touch units and a plurality of touch lines on the display substrate, wherein the plurality of touch units are arranged in an array on the display substrate and disposed in the display region; the touch line is connected to at least one of the touch units and configured to be connected to a touch integrated circuit; and the plurality of touch lines at least include a first trace and a second trace which are disposed in the non-display region, the first through hole being within an orthographic projection of the first trace on the conductive layer, the second through hole being within an orthographic projection of the second trace on the conductive layer, and a total opening area of the first through hole in per unit area of the first trace being greater than a total opening area of the second through hole in per unit area of the second trace.

BRIEF DESCRIPTION OF DRAWINGS

In order to describe the technical solutions in the embodiments of the present application more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
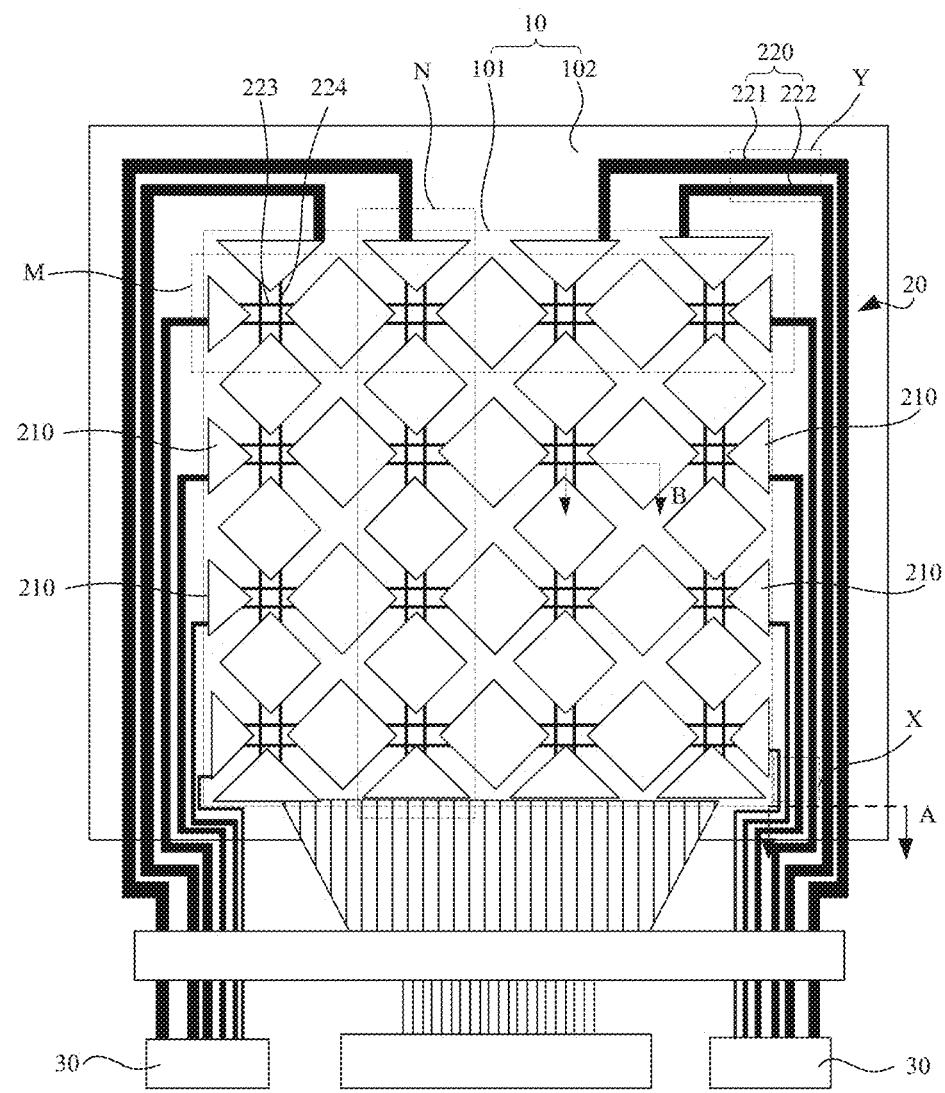
FIG. 1 is a schematic plan view of a touch display panel according to embodiments of the present disclosure.

Reference numerals in the figures are as follows:
10, display substrate; 101, display region; 102, non-display region; 103, gate drive circuit; 104, planarization layer; 105, packaging layer; 106, metal layer; 107, dam structure; 108, crack-blocking structure;
110, light-emitting unit; 111, conductive layer; 1121, first through hole; 1122, second through hole; 113, anode layer; 114, light-emitting layer; 115, cathode layer; 116, pixel-defining layer; 120, array substrate; 121, base substrate; 122, active layer; 123, gate insulating layer; 124, gate layer; 125, interlayer dielectric layer; 126, source-drain layer;
20, touch layer;
210, touch unit; 211, insulating layer; 212, conductive structure; M, first touch unit group; N, second touch unit group;
220, touch line; 221, first trace; 222, second trace; 223, first connection line; 224, second connection line; 2251, first sub-layer; 2252, second sub-layer; 226, via hole; and 30, touch integrated circuit.

DETAILED DESCRIPTION

To make the objectives, technical solutions and advantages of the present disclosure clearer, the embodiments of the present disclosure are further described hereinafter with reference to the accompanying drawings.

Unless otherwise defined, the technical terms or scientific terms used in the embodiments of the present disclosure have ordinary meanings as understood by the ordinary skill in the art to which the present disclosure belongs. The terms "first," "second," "third," and the like used in the description and claims of the present disclosure do not indicate any order, quantity, or importance, but are merely used to distinguish different components. Similarly, terms such as "a" or "an" do not indicate the quantity limit, but indicate the existence of at least one. The terms "comprise/include," "contain," and the like are intended to indicate that the elements or objects before the terms cover the elements, objects, or equivalents thereof listed after the terms, without excluding other elements or objects. The terms "connected," "connect," and the like are not limited to physical or mechanical connections, and may include electrical connections, and the connection may be direct or indirect. The terms "upper," "lower," "left," "right," "top," "bottom," and the like are only used to indicate the relative positional relations; and in the case that the absolute position of the described object changes, the relative positional relationship also changes accordingly.

A touch display panel known to the inventors typically includes a display substrate and a touch layer disposed on the display substrate. The touch layer includes a plurality of touch units and a plurality of touch lines connected to the plurality of touch units. The touch lines usually need to be led out to a side edge of the display substrate to be connected to the touch integrated circuit. In order to prevent the touch lines from adversely affecting a display effect of the touch display panel, it is required to extend the touch lines along the non-display region of the display substrate to the side edge of the display substrate. Different touch units are distributed at different positions and have different distances from the side edge where a touch integrated circuit is disposed. Thus, lengths of touch lines connected to different touch units are different, which leads to different resistances and capacitances corresponding to the different touch lines. As a result, the uniformity of signals transmitted by the touch lines is adversely affected, and the touch accuracy is reduced.

In order to improve the uniformity of the signals transmitted by the touch lines, the embodiments of the present disclosure provide a touch display panel. FIG. 1 is a schematic plan view of a touch display panel according to the embodiments of the present disclosure. As shown in FIG. 1, the touch display panel includes a display substrate 10 and a touch layer 20. The touch layer 20 is disposed on the display substrate 10.

The display substrate 10 includes a display region 101 and a non-display region 102 surrounding the display region 101. The display region 101 includes a plurality of pixels, and an image is displayed by controlling the plurality of pixels to emit light.

The touch layer 20 includes a plurality of touch units 210 and a plurality of touch lines 220. The plurality of touch units 210 are arranged in an array on the display substrate 10, and at least partially disposed in the display region 101. In some embodiments, all of the touch units 210 arc disposed in the display region 101. In some other embodiments, only part of the touch units 210 are disposed in the display region 101, and the other part of the touch units 210 are disposed in the non-display region 102. In some embodiments, among the plurality of touch units 210 arranged in an array, the outermost touch units 210 are disposed in the non-display region 102 or partially disposed in the non-display region 102.

The plurality of touch lines 220 are disposed on the display substrate 10, the touch line is connected to at least one of the touch units 210 and configured to electrically connect the touch unit 210 connected thereto to a touch integrated circuit 30, so as to be connected to the touch integrated circuit 30. The plurality of touch lines 220 at least include a first trace 221 and a second trace 222 which are disposed in the non-display region 102, a length of the first trace 221 being greater than a length of the second trace 222.

In some embodiments, the touch line 220 connecting the touch unit 210 to the touch integrated circuit 30 is achieved in a way that one end of the touch line is connected to the touch unit, and the other end of the touch line is connected to the touch integrated circuit.

In some other embodiments, the touch line 220 connecting the touch unit 210 to the touch integrated circuit 30 is achieved in a way that one ends of two touch lines are both connected to the touch unit, the other end of one touch line is connected to the touch integrated circuit, and the other end of the other touch line is lapped on the touch line connected to the touch integrated circuit.

In the embodiments of the present disclosure, the length of the first trace refers to the extending length from the end of the first trace connected to the touch unit to the end of the first trace connected to the touch integrated circuit; and the length of the second trace refers to the extending length from the end of the second trace connected to the touch unit to the end of the second trace connected to the touch integrated circuit.

In some embodiments, the main part of the touch line 220 is disposed in the non-display region 102, and part of the touch line 220 is disposed in the display region 101 so as to be connected to the touch unit 210.

Figure 2:
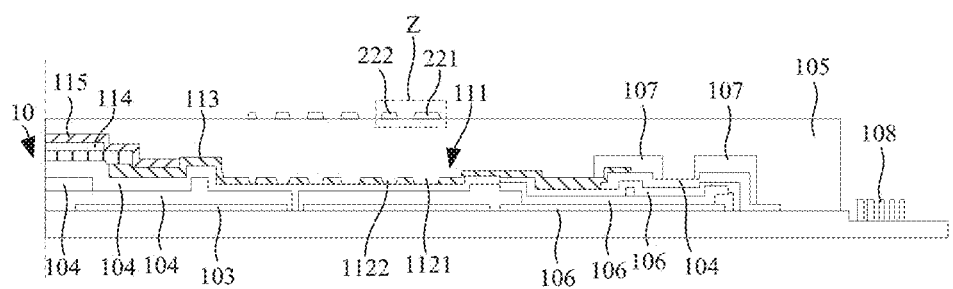
FIG. 2 is a cross-sectional view along line AA of the touch display panel provided in FIG. 1.

FIG. 2 is a cross-sectional view along line AA of the touch display panel provided in FIG. 1. In the figure, the part at the right side of the dotted line is the non-display region, and the part at the left side of the dotted line is the display region. The first trace and the second trace marked in FIG. 2 correspond to the first trace and the second trace marked in FIG. 1. As shown in FIG. 2, a cross-sectional area of the first trace 221 is larger than a cross-sectional area of the second trace 222.

In the embodiments of the present disclosure, the first trace 221 and the second trace 222 are relative, and two traces farthest from the display region 101 are illustrated in FIG. 1 as an example.

In the two traces framed by the region Y in FIG. 1, the longer one is the first trace 221, and the shorter one is the second trace 222.

In the two traces framed by the region Z in FIG. 2, the one having the larger cross-sectional area is the first trace 221, and the one having the smaller cross-sectional area is the second trace 222.

In some embodiments, thicknesses of the touch lines are the same, and the difference between the cross-sectional areas of the touch lines is reflected by the line widths of the touch lines. That is, the greater the line width of the touch line is, the larger the cross-sectional area of the touch line is; and the smaller the line width of the touch line is, the smaller the cross-sectional area of the touch line is.

In the touch display panel provided by the embodiments of the present disclosure, the touch lines 220 extend to an edge of the display substrate 10, and include the first trace 221 and the second trace 222 which are disposed in the non-display region 102 of the display panel. Because the greater the length of the touch line 220 is, the larger the resistance of the touch line 220 is, by setting the cross-sectional area of the first trace 221 with the greater length to be larger than the cross-sectional area of the second trace 222 with the smaller length, namely, by setting the cross-sectional area of the touch line 220 with the greater length to be larger, the resistance of the touch line 220 with the greater length is reduced. Thus, a problem of an increased resistance caused by the greater length of the touch line 220 is alleviated, such that the resistances of the different traces tend to be consistent, thereby improving the uniformity of signals transmitted by the touch lines 220.

In some embodiments, FIG. 2 shows six touch lines 220 disposed in the non-display region 102. With reference to FIG. 1, it can be seen that the lengths of the six touch lines 220 are all different, wherein any two of the six touch lines 220 are the first trace 221 and the second trace 222 relative to each other. The cross-sectional area of the longer trace in the touch lines 220 is larger than the cross-sectional area of the shorter trace in the touch lines 220.

In this way, by setting the cross-sectional area of the touch line 220 with the greater length to be larger, the resistance of the touch line 220 with the greater length is reduced. Thus, a problem of an increased resistance caused by the greater length of the touch line 220 is alleviated, such that the resistances of the different traces tend to be consistent, thereby improving the uniformity of the signals transmitted by the touch lines 220.

The number of touch units and the number of touch lines in FIG. 1 and FIG. 2 are merely examples, which can be set as required, and are not limited in the present disclosure.

In some embodiments, part of the touch lines in the plurality of touch lines have the same cross-sectional areas. For example, in the case of a limited space, part of the touch lines have the same lengths, and part of the touch lines have the same cross-sectional areas. That is, for two touch lines with different lengths, the cross-sectional areas of the touch lines may also be the same, as long as a resistance difference between the two touch lines is within a predetermined range and a problem that the uniformity of signals transmitted by the touch lines is adversely affected due to a large resistance difference between the different touch lines does not occur.

In some embodiments, a ratio of the cross-sectional area of the first trace 221 to the cross-sectional area of the second trace 222 is defined as a first ratio, a ratio of the length of the first trace 221 to the length of the second trace 222 is defined as a second ratio, wherein a ratio of the first ratio to the second ratio ranges from 0.95 to 1.05.

By limiting the first ratio and the second ratio within the above range, the resistance difference between the first trace and second trace can be kept within an appropriate range, and the resistances of the first trace and second trace tend to be consistent, such that the resistance difference between the first trace and second trace is not too large, so as to ensure that the uniformity of the signals transmitted by the touch lines is not adversely affected, thereby ensuring the touch accuracy of the touch display panel.

In some embodiments, due to a deviation caused by a manufacturing process or other factors, the ratio of the first ratio to the second ratio is about 1. That is, the ratio of the cross-sectional area of the first trace 221 to the cross-sectional area of the second trace 222 is about equal to the ratio of the length of the first trace 221 to the length of the second trace 222.

In this way, the ratio of the cross-sectional area of the first trace to the cross-sectional area of the second trace is equal to the ratio of the length of the first trace to the length of the second trace, such that the resistances of the first trace and the second trace tend to be consistent, thereby improving the uniformity of the signals transmitted by the touch lines.

In some embodiments, of the present disclosure, the ratio of the cross-sectional area of the first trace 221 to the cross-sectional area of the second trace 222 ranges from 1:1 to 1:5.

In some embodiments, as shown in FIG. 1, the touch layer 20 further includes a plurality of first connection lines 223 parallel to each other and a plurality of second connection lines 224 parallel to each other, the first connection lines 223 and the second connection lines 224 being disposed in the display region 101. An extension direction of the first connection line and an extension direction of the second connection line intersect, and in some embodiments, are perpendicular to each other.

In the embodiments of the present disclosure, the touch layer 20 is of a mutual-capacitance type touch structure, wherein one of the first connection line 223 and the second connection line 224 is a sensing signal line for receiving a touch sensing signal, and the other of the first connection line 223 and the second connection line 224 is a drive signal line for sending a touch drive signal. The touch unit 210 connected to the sensing signal line in the plurality of touch units 210 is a sensing electrode, and the touch unit 210 connected to the drive signal line in the plurality of touch units 210 is a drive electrode, the two touch units 210 being insulated from each other. In response to a hand touching a screen, a capacitance of a hand-touch position changes, and the hand-touch position is determined by the touch screen based on the position of the touch unit 210 whose capacitance is changed.

In some embodiments, as shown in FIG. 1, the first connection line 223 is a sensing signal line for receiving a touch sensing signal, and the second connection line 224 is a drive signal line for sending a touch drive signal.

In the embodiments of the present disclosure, the plurality of touch units are divided into a plurality of first touch unit groups M and a plurality of second touch unit groups N.

As shown in FIG. 1, the first touch unit group M includes a plurality of touch units 210 arranged in a same row. The plurality of touch units 210 in the first touch unit group M are connected via at least one first connection line 223 and connected to at least one touch line 220. The touch lines 220 connected to the plurality of touch units 210 in different first touch unit groups M are different.

In this way, by arranging a plurality of first connection lines 223 on one touch unit 210, the touch unit 210 is simultaneously connected to the plurality of connection lines, such that the touch sensitivity of the touch display panel is improved.

In some embodiments, as shown in FIG. 1, the first connection lines 223 connected to the touch units 210 in the same row are simultaneously connected to one touch line 220.

In this way, upon extending out of the display region 101, the plurality of first connection lines 223 connected to the touch units 210 in the first touch unit group M are simultaneously connected to one touch line 220, such that the touch lines 220 in the non-display region 102 is distributed more sparsely, thereby reducing the resistance and parasitic capacitance. Therefore, loads of the touch lines 220 tend to be consistent, thereby improving the uniformity of the signals transmitted by the touch lines 220.

In some embodiments, as shown in FIG. 1, the second touch unit group N includes a plurality of touch units 210 arranged in a same column. The plurality of touch units 210 in the second touch unit group N are connected via at least one second connection line 224 and connected to one touch line 220. The touch lines 220 connected to the plurality of touch units 210 in the different second touch unit group N are different.

In this way, by arranging the plurality of second connection lines 224 on one touch unit 210, the touch unit 210 is simultaneously connected to a plurality of connection lines, such that the touch sensitivity of the touch display panel is improved.

In some embodiments, as shown in FIG. 1, the second connection lines 224 connected to the touch units 210 in the same column are simultaneously connected to one touch line 220.

In this way, upon extending out of the display region 101, the plurality of second connection lines 224 connected to the touch units 210 in the second touch unit group N are simultaneously connected to one touch line 220, such that the touch lines 220 in the non-display region 102 is distributed more sparsely, thereby reducing the resistance and parasitic capacitance. Therefore, loads of the touch lines 220 tend to be consistent, thereby improving the uniformity of the signals transmitted by the touch lines 220.

In some embodiments, as shown in FIG. 1, the touch display panel further includes two touch integrated circuits 30. The first touch unit group M is connected to the two touch integrated circuits 30 via two of the touch lines 220 disposed outside the display region 101; and the second touch unit group N is connected to at least one of the touch integrated circuits 30 via at least one of the touch lines 220 disposed outside the display region 101.

By arranging two touch integrated circuits 30 which are distributed on two sides of the display region 101, the touch units 210 at different positions can be electrically connected to the touch integrated circuit 30 via the first connection line 223 shortest from the touch integrated circuits 30, such that the touch sensitivity is improved.

In some embodiments, the touch line 220 is in the same layer as the first connection line 223. The touch line being the same layer as the first connection line means that the touch line and the first connection line are disposed on a same side of a same layer structure, or the surfaces of the touch line and the first connection line that are close to the base substrate are both in contact with a same layer structure, or the touch line and the first connection line are made of a same material and formed by a same patterning process.

In some embodiments, the first connection line, the second connection line, and the touch line are all in the same layer.

In other implementations, the first connection line and the second connection line are in different layers, and the second connection line and the touch line are connected by a via hole, which are not limited by the embodiments of the present disclosure.

In the embodiments of the present disclosure, a layer relationship of the first connection line, the second connection line, and the touch unit includes the following cases.

First, the first connection line, the second connection line, and the touch unit are in the same layer.

Second, the first connection line and the second connection line are in the same layer, and the first connection line and the touch unit are in different layers.

Third, the first connection line and the second connection line are in different layers, and the first connection line and the touch unit are in the same layer.

Fourth, the first connection line and the second connection line are in different layers, and the second connection line and the touch unit are in the same layer.

Fifth, the first connection line, the second connection line, and the touch unit are all in different layers.

In some embodiments, the plurality of touch lines are of single-layer structures, and two adjacent touch lines in the plurality of touch lines are in different layers.

In some embodiments, for the above-mentioned first case, one of the two touch lines is in the same layer as the touch unit, and the other touch line is in a separate layer.

In some embodiments, for the above-mentioned second case, one of the two touch lines is in the same layer as the touch unit, and the other touch line is in the same layer as the first connection line or the second connection line.

In some embodiments, for the above-mentioned third case, one of the two touch lines is in the same layer as the touch unit, and the other touch line is in the same layer as the second connection line.

In some embodiments, for the above-mentioned fourth case, one of the two touch lines is in the same layer as the touch unit, and the other touch line is in the same layer as the first connection line.

In some embodiments, for the above-mentioned fifth case, one of the two touch lines is in the same layer as the touch unit, and the other touch line is in the same layer as the first connection line or the second connection line.

Figure 3:
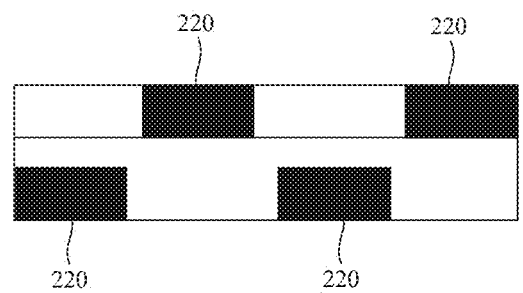
FIG. 3 is a schematic diagram of a layer structure of touch lines according to the embodiments of the present disclosure.

In some embodiments, FIG. 3 is a schematic diagram of a layer structure of touch lines according to some embodiments of the present disclosure. As shown in FIG. 3, four touch lines 220 are illustrated in FIG. 3; and in the direction from left to right, the first touch line 220 and the third touch line 220 are in the same layer, and the second touch line 220 and the fourth touch line 220 are in the same layer. Compared with a distribution mode that all of the touch lines are distributed in the same layer, the alternating distribution mode of the touch lines can reduce the distance between two adjacent touch lines, such that a distance between the touch lines in the direction parallel to the display substrate can be reduced, thereby achieving a narrow frame.

Figure 4:
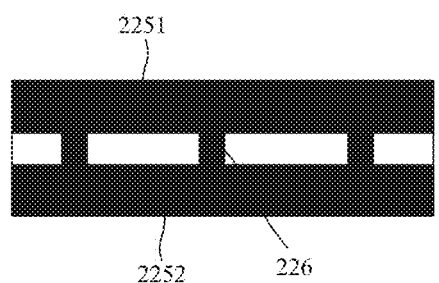
FIG. 4 is a schematic diagram of another layer structure of touch lines according to the embodiments of the present disclosure.

In some other embodiments, FIG. 4 is a schematic diagram of another layer structure of touch lines according to the embodiments of the present disclosure. As shown in FIG. 4, at least part of the touch lines include a first sub-layer 2251 and a second sub-layer 2252 disposed in different layers. Orthographic projections of the first sub-layer 2251 and the second sub-layer 2252 on the display substrate are at least partially overlapped, and the first sub-layer 2251 and the second sub-layer 2252 are connected to each other by at least one via hole 226.

In some embodiments, for the above-mentioned first case, one of the first sub-layer and the second sub-layer is in the same layer as the touch unit, and the other of the first sub-layer and the second sub-layer is in a separate layer.

In some embodiments, for the above-mentioned second case, one of the first sub-layer and the second sub-layer is in the same layer as the touch unit, and the other of the first sub-layer and the second sub-layer is in the same layer as the first connection line or the second connection line.

In some embodiments, for the above-mentioned third case, one of the first sub-layer and the second sub-layer is in the same layer as the touch unit, and the other of the first sub-layer and the second sub-layer is in the same layer as the second connection line.

In some embodiments, for the above-mentioned fourth case, one of the first sub-layer and the second sub-layer is in the same layer as the touch unit, and the other of the first and second sub-layers is in the same layer as the first connection line.

In some embodiments, for the above-mentioned fifth case, one of the first sub-layer and the second sub-layer is in the same layer as the touch unit, and the other of the first sub-layer and the second sub-layer is in the same layer as the first connection line or the second connection line.

In the embodiments of the present disclosure, all the touch lines are of the double-layer distribution structure; part of the touch lines are of the double-layer distribution structure; or all the touch lines are of a single-layer structure.

The cross-sectional area of the double-layer distributed touch lines is the sum of the cross-sectional areas of the two sub-layers.

In some embodiments, the touch display panel further includes a touch integrated circuit 30, and the first touch unit group and the second touch unit group are connected to the touch integrated circuit 30 respectively via one of the touch lines 220 disposed outside the display region 101. The cost can be effectively reduced by providing fewer touch integrated circuits.

Figure 5:
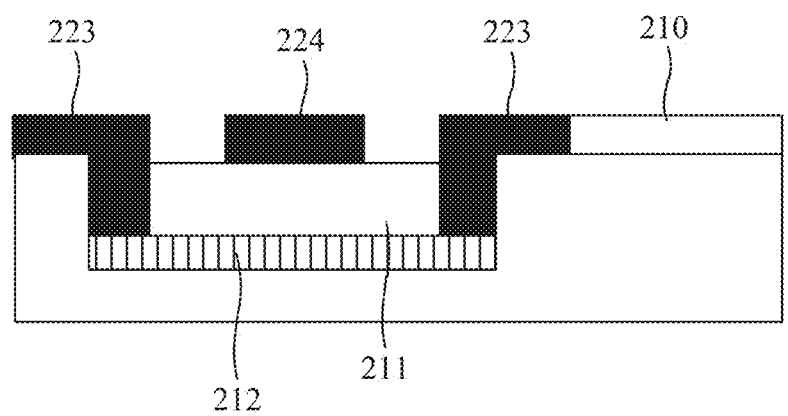
FIG. 5 is a cross-sectional view along line BB of a touch display panel.

FIG. 5 is a cross-sectional view along line BB of a touch display panel. As shown in FIG. 5, at an intersection of the first connection line 223 and the second connection line 224, a conductive structure 212 is disposed below the second connection line 224. In the case that the first connection line 223 passes the position where the second connection line 224 is disposed, the first connection line 223 is cross-layer connected through the conductive structure 212, so as to avoid a short circuit caused by the contact between the first connection line 223 and the second connection line 224 at the intersection.

As shown in FIG. 5, an insulating layer 211 is provided between the second connection line 224 and the conductive structure 212, to prevent a short circuit between the second connection line 224 and the conductive structure 212 at the intersection.

The first connection line 223, the touch unit 210, and the second connection line 224 are all in the same layer. The connection line being in the same layer as the touch unit means that the connection line and the touch unit are disposed on a same side of a same layer structure, or the surfaces of the connection line and the touch unit that are close to the base substrate are both in contact with a same layer structure, or the connection line and the touch unit are made of a same material and formed by a same patterning process.

In some implementations of the present disclosure, the touch unit is a transparent conductive layer. In some embodiments, the transparent conductive layer is an Indium tin oxide (ITO) layer or an Indium Zinc Oxide (IZO) layer.

In other implementations of the present disclosure, the touch unit 210 is of a metal mesh structure. The metal mesh structure is formed by interweaving metal wires and is in a shape of a mesh.

Because the metal mesh structure is made of metal wires and a structure for emitting light rays in the display substrate is a plurality of light-emitting units arranged in an array, in order to prevent the metal mesh structure from blocking the light rays emitted by the display substrate, the metal mesh structure is disposed in a way of surrounding the light-emitting units, so as to ensure a display effect of the display substrate.

In the embodiments of the present disclosure, the non-display region of the display substrate further includes a conductive film layer structure. The touch layer is disposed on the display substrate, such that the parasitic capacitance is easily formed between the touch line in the touch layer and the conductive film layer structure.

In addition, because the cross-sectional areas of the first trace and the second trace which are disposed in the non-display region in the touch lines are different, it is likely to cause a problem that the parasitic capacitance between the first trace and the conductive film layer and the parasitic capacitance between the second trace and the conductive film layer are different, which in turn adversely affects the uniformity of the signals transmitted by the touch lines and reduces the touch accuracy.

Therefore, the display substrate is modified in the embodiments of the present disclosure. As shown in FIG. 2, the display substrate 10 includes a conductive layer 111 disposed in the non-display region 102.

Figure 6:
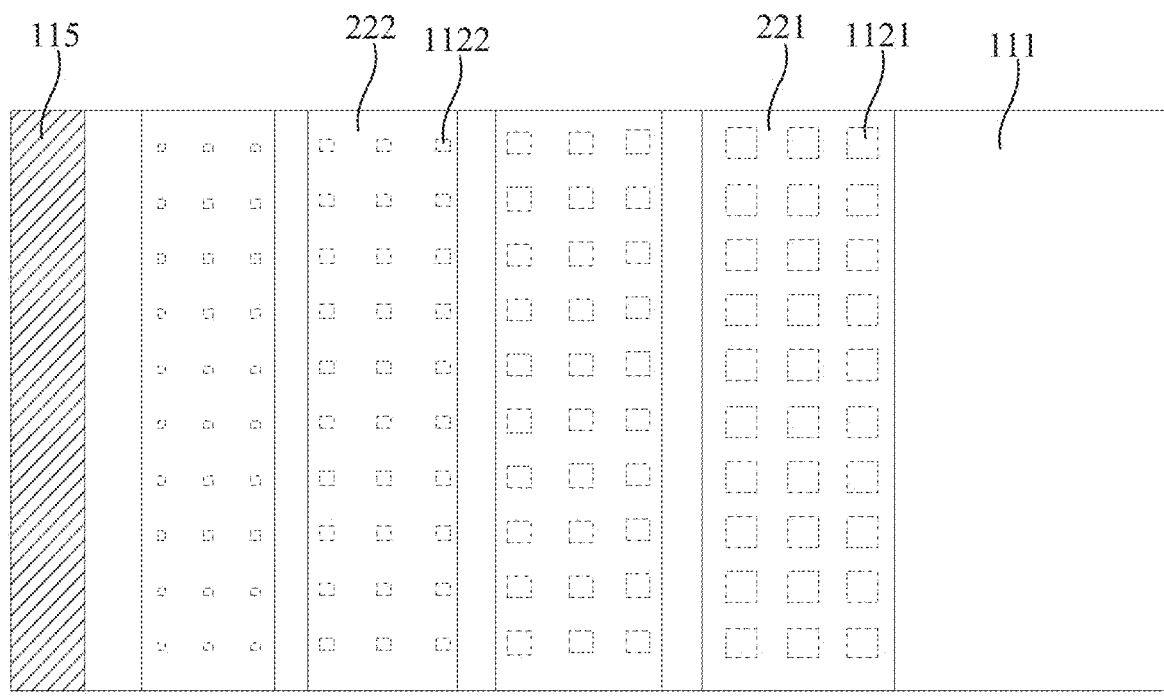
FIG. 6 is a plan view of an X region of the touch display panel provided in FIG. 1.

FIG. 6 is a plan view of an X region of the touch display panel provided in FIG. 1. As shown in FIG. 6, at least one first through hole 1121 and at least one second through hole 1122 are defined in the conductive layer 111. The first through hole 1121 is within an orthographic projection of the first trace 221 on the conductive layer 111, and the second through hole 1122 is within an orthographic projection of the second trace 222 on the conductive layer 111. A total opening area of the first through hole 1121 in per unit area of the first trace is greater than a total opening area of the second through hole 1122 in per unit area of the second trace.

The unit area of the first trace or the unit area of the second trace can be set as required, which is not limited in the embodiments of the present disclosure.

Because the first trace 221 is disposed above the first through hole 1121 and covers the first through hole 1121, the first through hole 1121 in FIG. 6 is shown in a dotted line to indicate that the first through hole 1121 is disposed below the first trace 221, rather than on the surface or above the first trace 221.

Because the second trace 222 is disposed above the second through hole 1122 and covers the second through hole 1122, the second through hole 1122 in FIG. 6 is shown in a dotted line to indicate that the second through hole 1122 is disposed below the second trace 222, rather than on the surface or above the second trace 222.

By forming the through holes in a region of the conductive layer 111 corresponding to the touch line 220, a relative area of the touch line 220 to the conductive layer 111 is reduced, thereby reducing the parasitic capacitance of the touch line 220. In addition, the total opening area of the first through hole 1121 in per unit area of the first trace is greater than the total opening area of the second through hole 1122 in per unit area of the second trace, that is, the larger the cross-sectional area of the touch line 220 is, the larger the total opening area of the through hole is. Thus, in the case that the cross-sectional area of the touch line 220 is increased, the relative area of the touch line 220 to the conductive layer 111 is reduced, such that the parasitic capacitance is reduced, thereby enabling the parasitic capacitances of the first trace 221 and the second trace 222 tend to be consistent.

In some embodiments, FIG. 6 shows four touch lines 220 disposed in the non-display region 102 as an example, and the cross-sectional areas of the four touch lines 220 are all different, wherein any two of the four touch lines 220 are the first trace 221 and the second trace 222 relative to each other.

With reference to FIG. 6, the total opening area of the second through hole 1122 in per unit area of the second trace is smaller than the total opening area of the first through hole 1121 in per unit area of the first trace.

In this way, by setting the through hole in the orthogonal projection of the touch line 220 with the larger cross-sectional area on the conductive layer 111 to be larger, the parasitic capacitance formed between the touch line 220 with the larger cross-sectional area and the conductive layer 111 is reduced. Thus, a problem of different parasitic capacitances caused by uneven cross-sectional areas of touch lines 220 is alleviated, such that the parasitic capacitances of the different traces tend to be consistent, thereby improving the uniformity of the signals transmitted by the touch lines 220.

In some embodiments, a ratio of the total opening area of the first through hole 1121 in per unit area of the first trace to the total opening area of the second through hole 1122 in per unit area of the second trace is equal to a ratio of the cross-sectional area of the first trace 221 to the cross-sectional area of the second trace 222.

In this way, the total opening area of the through hole in the region on the conductive layer 111 corresponding to the touch line 220 is proportionally set based on the cross-sectional area of the touch line 220, such that the parasitic capacitances of the touch lines 220 tend to be consistent, thereby effectively improving the uniformity of the signals transmitted by the touch lines 220.

Due to the size limitation of the touch display panel, the lengths and cross-sectional areas of the first and second traces may not meet a requirement of equal proportion, resulting in the resistances of the first trace and the second trace being inconsistent, which adversely affects the touch accuracy of the touch display panel.

In some embodiments, a product of the capacitance between the first trace 221 and the conductive layer 111 and the resistance of the first trace 221 is defined as a first load value; a product of the capacitance between the second trace 222 and the conductive layer 111 and the resistance of the second trace 222 is defined as a second load value; and a ratio of the first load value to the second load value ranges from 0.95 to 1.05.

By limiting the first load value and the second load value within the above range, both the resistance difference and the capacitance difference between the first trace and second trace can be kept within an appropriate range, and the total loads of the first trace and the second trace tend to be consistent, such that the load difference between the first trace and the second trace is not too large, so as not to adversely affect the uniformity of the signals transmitted by the touch lines, thereby ensuring the touch accuracy of the touch display panel.

In some embodiments, the ratio of the first load value to the second load value is 1, that is, the first load value is equal to the second load value.

In this way, the products of the resistances of the traces in the touch lines 220 and the capacitances between the traces and the conductive layer are equal, such that the loads of the different traces tend to be consistent, thereby improving the uniformity of the signals transmitted by the touch line.

In some embodiments, as shown in FIG. 6, a plurality of first through holes 1121 and a plurality of second through holes 1122 which are arranged in an array are defined in the conductive layer 111. A number of the first through holes 1121 is equal to a number of the second through holes 1122. An opening area of each first through hole 1121 is different from an opening area of each second through hole 1122, and a sum of the opening areas of the first through holes 1121 is greater than a sum of the opening areas of the second through holes 1122.

In some embodiments, as shown in FIG. 6, the first through holes 1121 and the second through holes 1122 are arranged in a rectangular array on the surface of the conductive layer 111.

The machining and manufacturing on the conductive layer 111 are convenient by arranging the first through holes 1121 and the second through holes 1122 in an array on the conductive layer 111. Meanwhile, because the number of the first through holes and the number of the second through holes are the same, the total opening areas of the through holes in the orthographic projections of the different touch lines 220 on the conductive layer 111 can be adjusted in equal proportion only by controlling the size of the opening area of a single first through hole and the size of the opening area of a single second through hole, which facilitates proportionally adjusting the total opening area of the through hole based on the cross-sectional area of the touch line 220.

In the embodiments of the present disclosure, the first through holes and the second through holes are arranged on the conductive layer 11 in other distribution modes besides the array distribution. In some embodiments, a plurality of first through holes disposed in the orthogonal projection of the touch line on the conductive layer 111 are circumferentially distributed on the surface of the conductive layer with one of the first through holes as the center; and a plurality of second through holes disposed in the orthogonal projection of the touch line on the conductive layer 111 are circumferentially distributed on the surface of the conductive layer with one of the second through holes as the center.

In some embodiments, the first through hole 1121 is in the shape of a polygon, a circle, an ellipse, or an irregular closed pattern.

In some embodiments, as shown in FIG. 6, the first through holes 1121 are in the shape of rectangular, and the shapes of the first through holes 1121 are the same. Alternatively, the shapes of the first through holes are different, for example, part of the first through holes are rectangular and the other part of the first through holes are circular.

In some embodiments, the second through hole 1122 is in the shape of a polygon, a circle, an ellipse, or an irregular closed pattern. In some embodiments, as shown in FIG. 6, the second through holes 1122 are rectangular, and the shapes of the second through holes 1122 are the same. Alternatively, the shapes of the second through holes are different, for example, part of the second through holes are rectangular and the other part of the second through holes are circular.

In some embodiments, the shapes of the first through hole and the second through hole are the same or different.

Figure 7:
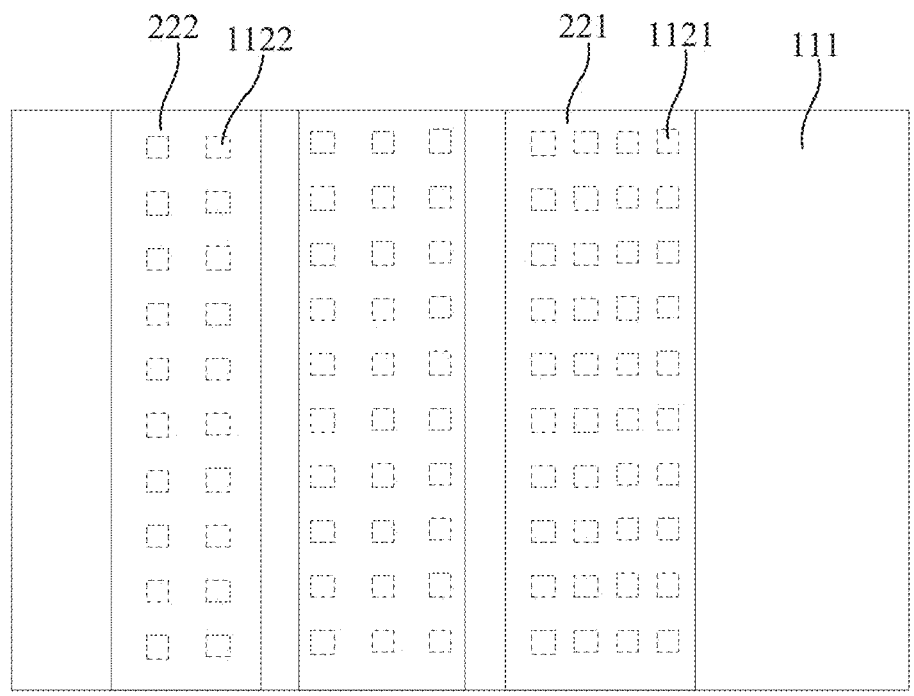
FIG. 7 is a schematic diagram of the distribution of through holes in a conductive layer according to the embodiments of the present disclosure.

In other implementations, FIG. 7 is a schematic diagram of the distribution of through holes in a conductive layer according to the embodiments of the present disclosure. As shown in FIG. 7, a plurality of first through holes 1121 and a plurality of second through holes 1122 are arranged in an array; an opening area of each first through hole 1121 and an opening area of each second through hole 1122 are the same; a number of the first through holes 1121 is different from a number of the second through holes 1122; and a sum of the opening areas of the first through holes 1121 is greater than a sum of the opening areas of the second through holes 1122.

In some embodiments, the first through holes 1121 and the second through holes 1122 are arranged in rectangular arrays on the surface of the conductive layer 111.

The machining and manufacturing on the conductive layer 111 are convenient by arranging the first through holes 1121 and the second through holes 1122 in an array on the conductive layer 111. Meanwhile, because the opening area of each first through hole 1121 and the opening area of each second through hole 1122 are the same, the areas of the through holes in the orthographic projections of the different touch lines 220 on the conductive layer 111 can be adjusted in equal proportion only by controlling the arrays with different numbers of the first through holes 1121 and the second through holes 1122, which facilitates proportionally adjusting the areas of the through holes based on the cross-sectional areas of the touch lines 220.

Figure 8:
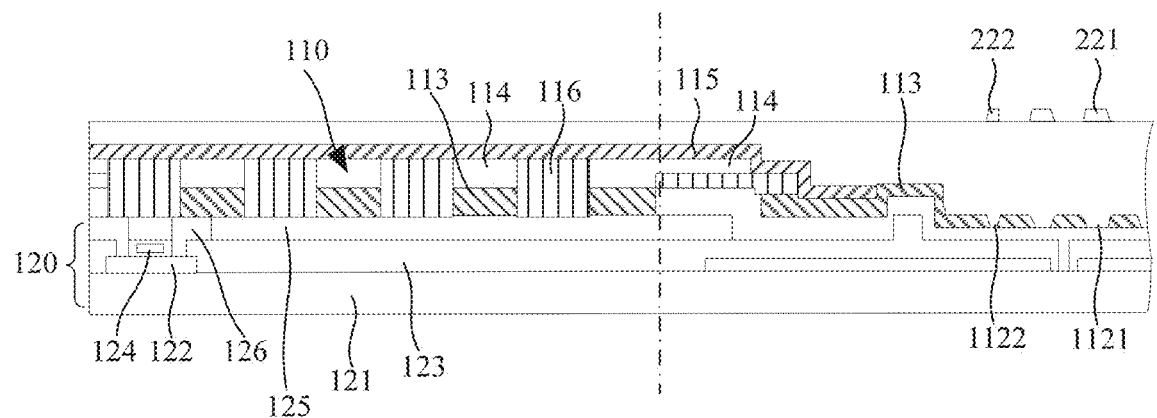
FIG. 8 is a schematic diagram of a layer structure of a touch display panel according to the embodiments of the present disclosure.

FIG. 8 is a schematic diagram of a layer structure of a touch display panel according to the embodiments of the present disclosure. In FIG. 8, the left side of the dashed line represents a display region, and the right side of the dashed line represents a non-display region. As shown in FIG. 8, the display substrate 10 includes an array substrate 120 and a plurality of light-emitting units 110. The light-emitting units 110 are arranged in an array on the array substrate 120, and are disposed in the display region 101.

As shown in FIG. 8, the light-emitting unit 110 includes an anode layer 113, a light-emitting layer 114, and a cathode layer 115 which are sequentially stacked; wherein the anode layer 113 or the cathode layer 115 is in the same layer as the conductive layer 111.

The anode layer or the cathode layer being in the same layer as the conductive layer means that the anode layer or the cathode layer and the conductive layer are disposed on a same side of a same layer structure, or the surfaces of the anode layer or cathode layer and the conductive layer that are close to the base substrate are both in contact with a same layer structure, or the anode layer or cathode layer and the conductive layer are made of a same material and manufactured by a same patterning process.

In the embodiments of the present disclosure, a power signal line is disposed in the non-display region 102 of the display panel, and is configured to provide a negative voltage signal. By using the conductive layer 111 as a conductive structure to connect the power signal line to the cathode layer 115, a constant voltage signal is provided, such that the power signal line supplies an electric potential to the cathode layer 115 through the conductive layer 111. Thus, there is a voltage difference between the cathode layer 115 and the anode layer 113, and an electric current is generated, enabling the light-emitting units to emit light with different luminance.

In some embodiments, as shown in FIG. 2, the anode layer 113 is in the same layer as the conductive layer 111, and an orthographic projection of the cathode layer 115 on the anode layer 113 is outside an orthographic projection of the second trace 222 on the anode layer 113.

In some embodiments, part region of the cathode layer 115 disposed at the edge of the display region 101 extends to the non-display region 102 and is connected to the power signal line in the non-display region 102 through the conductive layer 111. Moreover, the cathode layer 115 does not extend below the touch line 220, namely, there is no relative overlap between the cathode layer 115 and the touch line 220, which can prevent the formation of parasitic capacitance between the cathode layer 115 and the touch line 220, and effectively reduce the load of the touch line 220.

In some embodiments, the light-emitting layer 114 includes a hole transport layer (HTL), a hole injection layer (HIL), an electron transport layer (ETL), an electron injection layer (EIL), a hole block layer (HBL), an electron blocking layer (EBL), and a light-emitting material layer.

As shown in FIG. 8, the array substrate 120 includes a base substrate 121 and a plurality of drive circuits arranged in an array on the base substrate 121. The drive circuit is connected to at least one corresponding light-emitting unit 110. In this way, the light-emitting unit can emit light under the drive of the drive circuits connected thereto.

In the embodiments of the present disclosure, the array substrate 120 is a thin film transistor (TFT) substrate. Each drive circuit on the array substrate 120 includes at least two TFTs configured to control the light-emitting units connected thereto to emit light.

The drive circuit is electrically connected to the anode layer 113 of the light-emitting unit 110.

In some embodiments, in the display region 101, the array substrate includes a base substrate 121, an active layer 122, a gate insulating layer 123, a gate layer 124, an interlayer dielectric layer 125, and a source-drain layer 126 which are sequentially stacked. As shown in FIG. 5, the light-emitting unit 110 is connected to the source-drain layer 126 of the corresponding drive circuit.

The display substrate 10 further includes a pixel-defining layer 116 disposed on the array substrate 120. The pixel-defining layer 116 includes a plurality of openings distributed in an array, one light-emitting unit 110 being disposed in each opening.

In some embodiments, the base substrate 121 is made of glass, quartz, plastic, etc. The active layer 122 is made of amorphous silicon, polysilicon, metal oxide semiconductor, etc. The gate insulating layer 123 is made of silicon oxide, silicon nitride, silicon oxynitride, etc. The gate metal layer is made of a single-layer metal film such as molybdenum, copper, or titanium, or a multi-layer metal film such as molybdenum/aluminum/molybdenum or titanium/aluminum/titanium. The interlayer dielectric layer 125 is made of silicon oxide, silicon nitride, etc. The source-drain metal layer is made of a single-layer metal film such as aluminum, molybdenum, copper, or titanium, or as a multi-layer metal film such molybdenum/aluminum/molybdenum or titanium/aluminum/titanium. In some embodiments, the material of the active layer 122 includes low temperature poly-silicon (LTPS), low temperature polycrystalline oxide (LTPO), etc.

It should be noted that in the example, only the TFT substrate structure with a single-layer gate metal layer is illustrated, but the TFT substrate structure can also be of variety of structures such as a double-layer gate metal layer, which is not limited by the embodiments of the presented disclosure.

In some embodiments, as shown in FIG. 2, in the non-display region 102, the display substrate includes a base substrate 121, a gate drive circuit 103, a multilayer planarization layer 104, a conductive layer 111, a pixel-defining layer 116, a cathode layer 115, and a packaging layer 105 which are sequentially stacked.

As shown in FIG. 2, the display substrate further includes a power signal line disposed on a side of the gate drive circuit 103. The power signal line includes three stacked metal layers 106, and the conductive layer 111 is stacked on the metal layers 106, such that the metal layers 106 are connected to the conductive layer 111, thereby achieving the connection between the power signal line and the cathode layer 115, and enabling the power signal line to provide an electric potential for the cathode layer 115.

In some embodiments, a planarization layer 104 and a dam structure 107 are sequentially stacked on the power signal line. The dam structure 107 is disposed in the non-display region and arranged around the display region, and is configured to prevent water and oxygen from entering the display region, so as to protect the light-emitting unit.

On the display substrate, a crack-blocking structure 108 stacked on the base substrate 121 is also provided on a side of the power signal line distal from the display region. The crack-blocking structure 108 is disposed at the outermost side of the non-display region, and is configured to prevent a crack at the edge of the base substrate from extending into the display region.

According to the embodiments of the present disclosure, a display apparatus is provided. The display apparatus includes: the touch display panel as described above and a power supply component electrically connected to the touch display panel. The power supply component is a power source or the like.

In some embodiments, the display apparatus is any product or component having a display function, such as a mobile phone, a tablet computer, a television, a display, a laptop computer, a digital photo frame, or a navigator.

Figure 9:
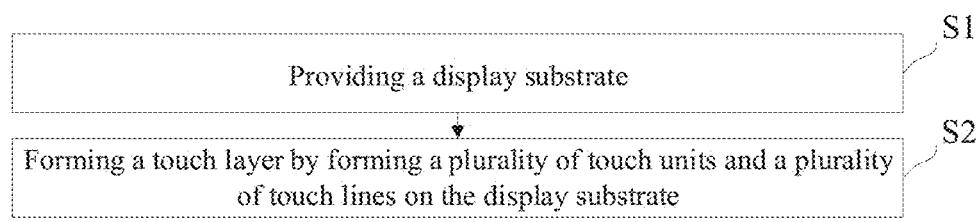
FIG. 9 is a flowchart of a method for manufacturing a touch display panel according to the embodiments of the present disclosure.

FIG. 9 is a flowchart of a method for manufacturing a touch display panel according to the embodiments of the present disclosure. As shown in FIG. 9, the method includes the following processes.

In S1, a display substrate is provided.

As shown in FIG. 1, the display substrate 10 includes a display region 101 and a non-display region 102 surrounding the display region 101.

In S2, a touch layer is formed by forming a plurality of touch units and a plurality of touch lines on the display substrate.

For the structure and the distribution of the touch units and the touch lines, please refer to the embodiments shown in FIG. 1 to FIG. 4.

The specific structure of the display substrate may refer to the embodiment shown in FIG. 8.

In some embodiments, during the manufacturing of the touch lines in S2, a first trace and a second trace which have different cross-sectional areas are formed by one patterning process.

In S2, manufacturing the display substrate further includes: forming a conductive layer on the base substrate.

The structure of the conductive layer may refer to the embodiment shown in FIG. 2.

In some embodiments, the first through hole and the second through hole in the conductive layer are formed by etching. A specific method of the etching may refer to the related art.

In the touch display panel manufactured by the above method, the touch lines 220 extend to an edge of the display substrate 10, and include the first trace 221 and the second trace 222 which are disposed in the non-display region 102 of the display panel. Because the greater the length of the touch line 220 is, the larger the resistance of the touch line 220 is, by setting the cross-sectional area of the first trace 221 with the greater length to be larger than the cross-sectional area of the second trace 222 with the smaller length, namely, by setting the cross-sectional area of the touch line 220 with the greater length to be larger, the resistance of the touch line 220 with the greater length can be reduced. Thus, a problem of an increased resistance caused by the greater length of the touch line 220 is alleviated, such that the resistances of the different traces tend to be consistent, thereby improving the uniformity of the signals transmitted by the touch lines 220.

The foregoing descriptions are not intended to limit the present disclosure in any form. Although the present disclosure is disclosed as above by the embodiments, the embodiments are not intended to limit the present disclosure. Any person in this art can make some amendments or modifications to these embodiments by using the technical content disclosed above without departing from the scope of the technical solutions of the present disclosure to acquire equivalent embodiments with some equivalent changes. Any simple modifications, equivalent changes, and modifications made to the above embodiments according to the technical essence of the present disclosure without departing from the content of the technical solutions of the present disclosure are still within the scope of the technical solutions of the present disclosure.

What is claimed is:

1. A touch display panel, comprising: a display substrate and a touch layer; wherein
   the display substrate comprises a display region and a non-display region surrounding the display region; and
   the touch layer comprises a plurality of touch units and a plurality of touch lines; wherein
   the plurality of touch units are arranged in an array on the display substrate and at least partially disposed in the display region;
   the plurality of touch lines are disposed on the display substrate, and each touch line of the plurality of touch lines is connected to at least one of the plurality of touch units and configured to electrically connect a touch unit connected thereto to a touch integrated circuit;
   the plurality of touch lines at least comprise a first trace and a second trace which are disposed in the non-display region; and
   the display substrate comprises a conductive layer disposed in the non-display region; wherein at least one first through hole and at least one second through hole are defined in the conductive layer, the at least one first through hole being within an orthographic projection of the first trace on the conductive layer, the at least one second through hole being within an orthographic projection of the second trace on the conductive layer, and a total opening area of the at least one first through hole in per unit area of the first trace being greater than a total opening area of the at least one second through hole in per unit area of the second trace.

2. The touch display panel according to claim 1, wherein a ratio of a cross-sectional area of the first trace to a cross-sectional area of the second trace is defined as a first ratio, a ratio of a length of the first trace to a length of the second trace is defined as a second ratio, wherein a ratio of the first ratio to the second ratio ranges from 0.95 to 1.05.

3. The touch display panel according to claim 1, wherein a ratio of the total opening area of the at least one first through hole in per unit area of the first trace to the total opening area of the at least one second through hole in per unit area of the second trace is equal to a ratio of a cross-sectional area of the first trace to a cross-sectional area of the second trace.

4. The touch display panel according to claim 1, wherein a product of a capacitance between the first trace and the conductive layer and a resistance of the first trace is defined as a first load value, a product of a capacitance between the second trace and the conductive layer and a resistance of the second trace is defined as a second load value, wherein a ratio of the first load value to the second load value ranges from 0.95 to 1.05.

5. The touch display panel according to claim 1, wherein a plurality of first through holes and a plurality of second through holes which are arranged in an array are defined in the conductive layer, a number of the plurality of first through holes being equal to a number of the plurality of second through holes, an opening area of each of the plurality of first through holes being different from an opening area of each of the plurality of second through holes, and a sum of opening areas of the plurality of first through holes being greater than a sum of opening areas of the plurality of second through holes.

6. The touch display panel according to claim 1, wherein a plurality of first through holes and a plurality of second through holes which are arranged in an array are defined in the conductive layer, an opening area of each of the plurality of first through holes being equal to an opening area of each of the plurality of second through holes, a number of the plurality of first through holes being different from a number of the plurality of second through holes, and a sum of opening areas of the plurality of first through holes being greater than a sum of opening areas of the plurality of second through holes.

7. The touch display panel according to claim 1, wherein the at least one first through hole is in a shape of a polygon, a circle, an ellipse, or an irregular closed pattern, and the at least one second through hole is in a shape of a polygon, a circle, an ellipse, or an irregular closed pattern.

8. The touch display panel according to claim 7, wherein the shape of the at least one first through hole is the same as or different from the shape of the at least one second through hole.

9. The touch display panel according to claim 1, wherein the display substrate further comprises a plurality of light-emitting units disposed in the display region, each light-emitting unit of the plurality of light-emitting units comprising an anode layer, a light-emitting layer, and a cathode layer which are sequentially stacked, and the anode layer or the cathode layer being in a same layer as the conductive layer.

10. The touch display panel according to claim 9, wherein the anode layer is in the same layer as the conductive layer, and an orthographic projection of the cathode layer on the anode layer is outside an orthographic projection of the second trace on the anode layer.

11. The touch display panel according to claim 10, wherein the display substrate further comprises a power signal line disposed in the non-display region, the conductive layer being connected to the power signal line and the cathode layer.

12. The touch display panel according to claim 1, wherein the touch layer further comprises a plurality of first connection lines parallel to each other and a plurality of second connection lines parallel to each other, the plurality of first connection lines and the plurality of second connection lines being disposed in the display region; and
 the plurality of touch units are divided into a plurality of first touch unit groups and a plurality of second touch unit groups, wherein
  a first touch unit group of the plurality of first touch unit groups comprises a plurality of touch units arranged in a same row, the plurality of touch units in the first touch unit group are connected via at least one of the plurality of first connection lines and connected to at least one of the plurality of touch lines, and touch lines connected to plurality of touch units in different first touch unit groups are different; and
  a second touch unit group of the plurality of second touch unit groups comprises a plurality of touch units arranged in a same column, the plurality of touch units in the second touch unit group are connected via at least one of the plurality of second connection lines and connected to one of the plurality of touch lines, and touch lines connected to plurality of touch units in different second touch unit groups are different.

13. The touch display panel according to claim 12, wherein each touch unit of the plurality of touch units is a transparent conductive layer or is of a metal mesh structure.

14. The touch display panel according to claim 12, further comprising: two touch integrated circuits, wherein the first touch unit group is connected to the two touch integrated circuits via two of the plurality of touch lines disposed outside the display region, and the second touch unit group is connected to at least one of the two touch integrated circuits via at least one of the plurality of touch lines disposed outside the display region.

15. The touch display panel according to claim 12, further comprising: the touch integrated circuit, wherein the first touch unit group and the second touch unit group are connected to the touch integrated circuit via one of the plurality of touch lines disposed outside the display region.

16. The touch display panel according to claim 1, wherein the display substrate comprises an array substrate and a plurality of light-emitting units; wherein
 the plurality of light-emitting units are arranged in an array on the array substrate;
 the array substrate comprises a base substrate and a plurality of drive circuits, the plurality of drive circuits being arranged in an array on the base substrate; and
 a drive circuit of the plurality of drive circuits is connected to at least one of the plurality of light-emitting units corresponding to the drive circuit.

17. The touch display panel according to claim 1, wherein each touch line of the plurality of touch lines is a single-layer structure, and two adjacent touch lines in the plurality of touch lines are in different layers; or
 at least part of the plurality of touch lines comprise a first sub-layer and a second sub-layer which are disposed in different layers, orthographic projections of the first sub-layer and the second sub-layer on the display substrate being at least partially overlapped, and the first sub-layer and the second sub-layer being connected to each other by at least one via hole.

18. A display apparatus, comprising a touch display panel and a power supply component electrically connected to the touch display panel;
 wherein the touch display panel comprises: a display substrate and a touch layer; wherein
  the display substrate comprises a display region and a non-display region surrounding the display region; and
  the touch layer comprises a plurality of touch units and a plurality of touch lines; wherein
   the plurality of touch units are arranged in an array on the display substrate and at least partially disposed in the display region;
   the plurality of touch lines are disposed on the display substrate, and each touch line of the plurality of touch lines is connected to at least one of the plurality of touch units and configured to electrically connect a touch unit connected thereto to a touch integrated circuit;
   the plurality of touch lines at least comprise a first trace and a second trace which are disposed in the non-display region; and
   the display substrate comprises a conductive layer disposed in the non-display region; wherein at least one first through hole and at least one second through hole are defined in the conductive layer, the at least one first through hole being within an orthographic projection of the first trace on the conductive layer, the at least one second through hole being within an orthographic projection of the second trace on the conductive layer, and a total opening area of the at least one first through hole in per unit area of the first trace being greater than a total opening area of the at least one second through hole in per unit area of the second trace.

19. The display apparatus according to claim 18, wherein a ratio of the total opening area of the at least one first through hole in per unit area of the first trace to the total opening area of the at least one second through hole in per unit area of the second trace is equal to a ratio of a cross-sectional area of the first trace to a cross-sectional area of the second trace.

20. A method for manufacturing a touch display panel, comprising:

providing a display substrate, wherein the display substrate comprises a display region and a non-display region surrounding the display region, the display substrate comprises a conductive layer disposed in the non-display region, and at least one first through hole and at least one second through hole are defined in the conductive layer; and forming a touch layer by forming a plurality of touch units and a plurality of touch lines on the display substrate, wherein the plurality of touch units are arranged in an array on the display substrate and disposed in the display region; each touch line of the plurality of touch lines is connected to at least one of the plurality of touch units and configured to be connected to a touch integrated circuit; and the plurality of touch lines at least comprise a first trace and a second trace which are disposed in the non-display region, the at least one first through hole being within an orthographic projection of the first trace on the conductive layer, the at least one second through hole being within an orthographic projection of the second trace on the conductive layer, and a total opening area of the at least one first through hole in per unit area of the first trace being greater than a total opening area of the at least one second through hole in per unit area of the second trace.

* * * * *